United States Patent

Suzuki et al.

[11] Patent Number: 6,119,359
[45] Date of Patent: Sep. 19, 2000

[54] MEASURING INSTRUMENT

[75] Inventors: Mikio Suzuki; Shuuji Hayashida, both of Kawasaki, Japan

[73] Assignee: Mitutoyo Corporation, Kawasaki, Japan

[21] Appl. No.: 09/087,972

[22] Filed: Jun. 1, 1998

[30] Foreign Application Priority Data

Jun. 10, 1997 [JP] Japan .................................. 9-152104

[51] Int. Cl.$^7$ ...................................................... G01B 3/22
[52] U.S. Cl. ............................. 33/832; 33/556; 33/559; 33/613; 33/706
[58] Field of Search .............................. 33/832, 833, 834, 33/836, 613, 706, 707, 542, 544, 542.1, 556, 558, 559, 565

[56] References Cited

U.S. PATENT DOCUMENTS

| | | | |
|---|---|---|---|
| Re. 35,263 | 6/1996 | Silva et al. ................................. | 433/74 |
| 4,288,925 | 9/1981 | McMurtry ................................. | 33/832 |
| 4,495,701 | 1/1985 | Nakadoi ................................... | 33/558 |
| 4,566,201 | 1/1986 | Ishii .......................................... | 33/558 |
| 4,765,064 | 8/1988 | Maeda ....................................... | 33/832 |
| 5,172,485 | 12/1992 | Gerhard . | |
| 5,570,551 | 11/1996 | Koc, Sr. et al. .......................... | 52/314 |
| 5,658,086 | 8/1997 | Brokaw et al. ........................... | 403/327 |

*Primary Examiner*—Andrew H. Hirshfeld
*Attorney, Agent, or Firm*—Oliff & Berridge, PLC

[57] ABSTRACT

An electrical base 32 having a stationary detection element 31 is fixed to a body case 11 movably supporting a spindle 13, and a synthetic resin made scale holder 34 is provided to synchronize with the spindle 13 and move through a guide 33. In addition, a scale 36 having a movable detection element 35 is adherently fixed to the scale holder 34 at a plurality of points. More specifically, a projection 51 is fixed through an adhesive layer 52 to the back face of the scale 36, and held in a accommodating hole 46 formed in the scale holder 34, and then adhered through an adhesive layer 53 in the circumferential direction. As a result, the reduction in weight can be achieved and a disadvantage with the reduction in weight (which is that a gap between a stationary detection element and a movable detection element is changed) can be resolved.

14 Claims, 4 Drawing Sheets

MEASURING INSTRUMENT

BACKGROUND OF THE INVENTION

1. Field of the Invention

This invention relates to a measuring instrument for measuring a length or a thickness of an object with the moving displacement amount of a spindle. More specifically, this invention relates to an attachment formation for a movable detection element in a formation for detecting the moving displacement amount of the spindle by a detecting means having a stationary detecting means and a movable detecting means.

2. Description of the Related Art

There is a known measuring instrument associated with a body; a spindle which is movably disposed in the body; and a detecting means, including a stationary detection element secured to the body and a movable detection element which is placed opposite the stationary detection element separated therefrom at a predetermined gap and synchronizes with the spindle and moves in the moving direction of the spindle, and being for detecting the relative moving displacement amount between both detecting elements as an electric signal.

The know type is, for example, a digital readout dial gauge to detect the moving displacement amount of a spindle, movably disposed in a body, as an electric signal by a detecting means, and display the detected value in a digital form, in which the detecting means is of an optical type, a capacitance type or the like and is provided with a scale having a stationary detection element (e.g., a light emitting and receiving portion, an electrode) disposed in the body and a movable detection element (e.g., a light emitting and receiving portion, an electrode) placed opposite the stationary detection element separated therefrom at a predetermined gap and synchronizing with the spindle and moving in the moving direction of the spindle.

Conventionally, in the measuring instrument as described above, on the grounds that when a gap between the stationary detection element and the movable detection element is changed, miscount occurs and the stable and precise measurement is not achieved, a formation capable of assembling while a processing dimension error of each component is being absorbed is employed.

More specifically, the stationary detection element is fixed in the body, and a metal scale holder is integrally fixed to the spindle or a metal scale holder is movably disposed in the body. The scale holder is forcibly pressed to abut to the end portion constantly by a spring or the like in order to be synchronized with the spindle and moved in the moving direction of the spindle. And then a scale having the movable detection element is adhered onto the nearly overall surface of the scale holder through an adhesive layer. Thereby, the measuring instrument is assembled to retain the constant gap between the stationary detection element and the movable detection element while the processing dimension error of each component is absorbed by the adhesive layer.

The conventional formation has advantages in that the contour precision is easily achieved and the rigidity is high due to the fact that the scale holder is made of metal, however, it also has disadvantages from the viewpoints of portability and operability in a measuring instrument used for measurement by hand.

In order to resolve the above disadvantages, it is considered that the scale holder is reduced in weight, for example, the scale holder is made of synthetic resin. In using the synthetic resin made scale holder, however, the scale having the movable detection element is adhered through the adhesive layer onto the overall surface of the scale holder, and shrinkage in cure of the adhesive layer causes warpage on the scale holder; warpage also occurs on the scale, whereby the gap between the stationary detection element and the movable detection element is changed, resulting in the difficulty of obtaining a precise measurement.

Even when the assembly with the constant gap between the stationary detection element and the movable detection element is achieved, an adhesive on the adhesive layer is repeatedly expanded and shrunk in every experiences in temperature cycles and humidity change, whereby the surface state of the movable detection element adhered is changed by the residually internal stress, resulting in precise deterioration of the products.

It is an object of the present invention to provide a measuring instrument in which the conventional disadvantages as described above are resolved, and that reduction in weight is achieved, and the disadvantages with the reduction in weight are resolved; in other words, to provide a measuring instrument in which a constant gap between a stationary detection element and a movable detection element is ensured while a processing dimension error of each component is absorbed, and which is seldom susceptible to shrinkage of an adhesive layer.

SUMMARY OF THE INVENTION

A measuring instrument according to the present invention, which includes a body; a spindle provided in the body to move; and a detecting means, having a stationary detection element fixed in the body and a movable detection element which is placed opposite the stationary detection element separated therefrom at a predetermined gap, and synchronizes with the spindle and moves in the moving direction of the spindle, for detecting the relative moving displacement amount between both detecting elements as an electric signal, it is characterized by including a synthetic resin made holder synchronizing and moving with the movement of the spindle, the holder being adhered with the movable detection element at a plurality of points.

According to the aforementioned structure, the holder is made of synthetic resin, so that the weight can be decreased as compared with a case where a holder is made of metal. Therefore, the improvement of portability and operability is promised.

As compared with a case where an overall face of a holder is adhered through an adhesive layer, the movable detection element is not susceptible to the expansion and shrinkage of the adhesive layer due to the fact that the movable detection element is adherently fixed to the holder at a plurality of points. Therefore, the gap between the stationary detection element and the movable detection element is retained to be constant while a processing dimension error of each component is absorbed, in addition, the constant gap is retained stably for a long time.

In this point, the number of adhering points of the movable detection element and the holder can be selected, but the larger number of adhering points causes an inefficient assembly. For example, it is beneficial to assembling processes that the movable detection element and the holder are adherently fixed at two points separated from each other along the moving direction of the spindle at a predetermined space.

More specifically, where the movable detection element is adherently fixed to the holder at a plurality of points, for example, it is expedient that a plurality of projections are provided on a face of the movable detection element which is opposite the other face confronting the stationary detection element, and a plurality of accommodating holes for holding the projections are disposed at the positions of the holder, corresponding to the projections respectively, so that the movable detection element is adherently fixed to the holder through an adhesive layer laid between the outer circumferential face of the projection and the inner circumferential face of the accommodating hole in the state that the projections are respectively inserted into the accommodating holes.

The movable detection element is adherently fixed to the holder through the adhesive layer laid between the outer circumferential face of the projection positioned to the movable detection element and the inner circumferential face of the accommodating hole formed in the holder, so that the gap between the stationary detection element and the movable detection element is adjusted through the displacement the movable detection element in the extending direction of the projection. Therefore, the adjustable range can be defined to be larger without increasing the thickness of the adhesive layer. That is to say, even when the processing dimension error of each component is relatively larger, it is absorbed. In addition, the expansion and shrinkage of the adhesive layer has little effect due to the fact of the adhesion through the medium of the adhesive layer in the circumferential direction of the projection.

In the above structure, each projection may be integrally projected from the face of the movable detection element which is opposite the other face facing the stationary detection element. Alternatively, the projection may be formed as an independent component and adhered to the face through an adhesive layer.

According to the above formation, the movable detection element is easily structured, and the adhesive layer between the movable detection element and the projection also absorbs the processing dimension error of each component.

In the above structure, the holder may be formed to be combined with the spindle. Alternatively, the holder may be formed as an independent component, and is movably held with a guide, made of synthetic resin and disposed in the body.

In this case, the holder and the guide can be formed of synthetic resin of the same material or synthetic resin of a different material from each other.

For example, where the holder and the guide are made of synthetic resin of the same material, a glass nylon type polyamide resin is preferable. A glass nylon type polyamide resin has the high hardness and strength, so that the sliding performance of the holder with respect to the guide is retained for a long time.

Where the holder and the guide are made of synthetic resin of a different material from each other, it is advisable that the holder is made of a nylon type polyamide resin, and the guide is made of an acetal resin. Comparing this case with the case where the scale holder and the guide are formed of a glass nylon type polyamide resin, similar hardness and strength can be obtained, and in addition, merits such as an easy production, the reduction in warpage, and so on can be obtained, and the production costs can be reduced.

A measuring instrument according to the present invention, which is provided with a body, a spindle disposed in the body to move, and a detecting means for detecting the moving displacement amount of the spindle as an electric signal, is characterized in that the detecting means comprises an electrical base fixed along the axial direction of the spindle in the body and having a stationary detection element; a guide made of synthetic resin and screwed to the electrical base; a synthetic resin made holder which is placed in a space between the electrical base and the guide to synchronize with the spindle and move in the moving direction of the spindle; and a scale having a movable detection element and disposed in the holder to face the stationary detection element at a determined gap, in which the holder is provided with a plurality of accommodating holes formed along the moving direction of the spindle, and the scale is provided with a plurality of projections which respectively are held in the accommodating holes, and is adhered to the holder through an adhesive layer placed between the outer circumferential face of the projection and the inner circumferential face of the accommodating hole in the state that the projections are respectively held in the accommodating holes.

According to the above structure, in addition to the aforementioned effects, that is the achievement of the reduction in weight and the solution of the disadvantage therewith, the holder is stably moved in the same direction as the moving direction of the spindle while retaining a constant bearing with respect to the electrical base due to the fact that the holder is movably placed in the space between the electrical base and the guide. Therefore, the gap between the movable detection element disposed in the holder and the stationary detection element fixed in the body is retained to be constant, so that the high precise measurement is insured.

In the aforementioned description, as means for retaining the gap between the stationary detection element and the movable detection element in a constant, the holder (and further, the scale and the movable detection element) may be held at the predetermined position by the guide, alternatively, a projection, sliding on and being in contact with both sides of the face of the electrical base with the stationary detection element between, can be formed on the face of the holder on which the movable detection element is attached.

As a result, in the range from the face of the holder with the movable detection element to the projection, the gap between the stationary detection element and the movable detection element is set, so that the gap between the stationary detection element and the movable detection element can be precisely set with a simple structure.

The guide is required to movably hold the holder between the guide and the electrical base. For example, when the guide consists of a pair of guiding blocks which are fixed on both sides of the face of the electrical base with the stationary detection element between, and a guiding plate which extends across a pair of the guiding sections, all the periphery of the holder is encircled, so that the holder is held to move in the moving direction of the spindle stably.

Here, when a pair of protrudent portions for guiding both sides of the holder are formed on each inner side face of the guiding block or a pair of protrudent portions abutting onto the face of the holder that is opposite the face having the movable detection element are formed on the inner face of the guiding plate, the sliding resistance produced at the time the holder is moved can be decreased.

DETAILED DESCRIPTION OF THE PREFERRED EMBODIMENT(S)

A preferred embodiment according to the present invention will be described below with reference to the attached drawings.

Figure 1:
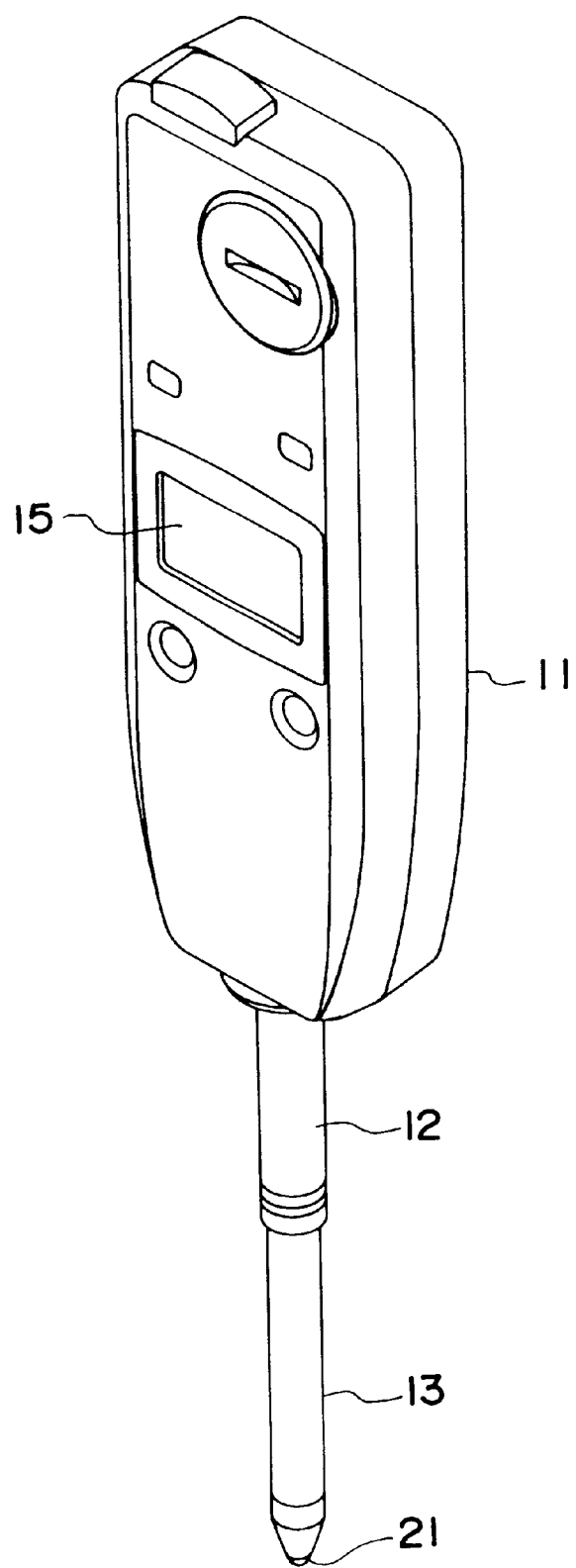
FIG. 1 is a perspective view showing a preferred embodiment of a measuring instrument according to the present invention.
Figure 2:
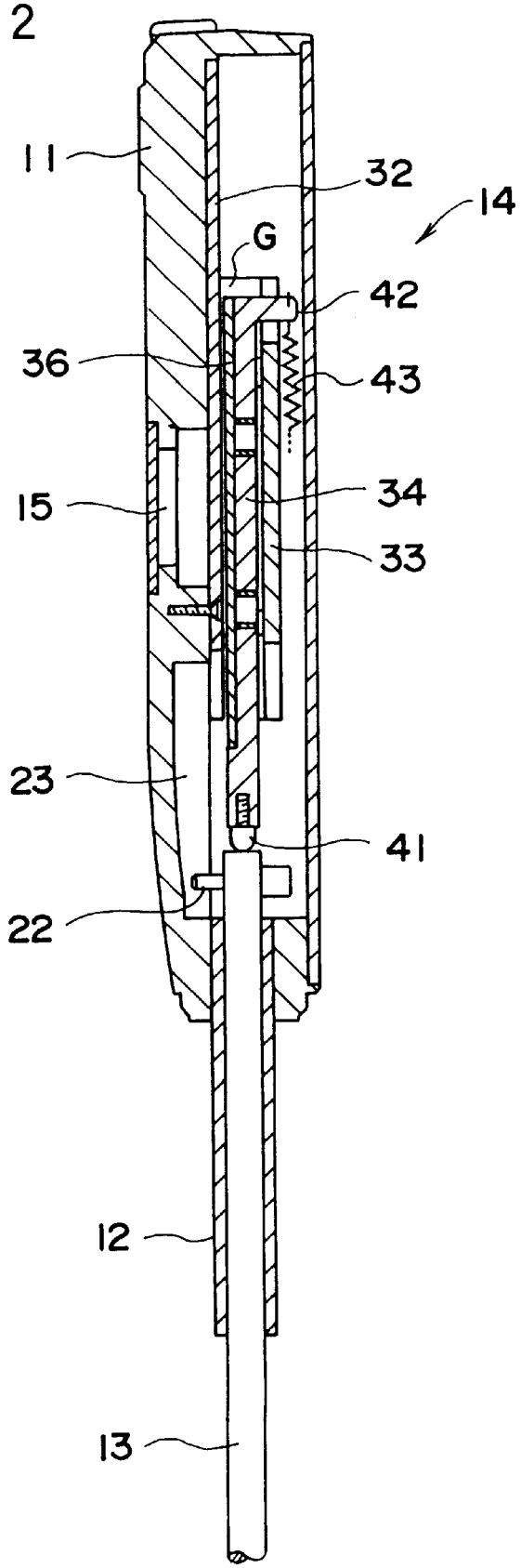
FIG. 2 is a sectional view of the preferred embodiment.

FIG. 1 shows a perspective view of a dial gauge according to the preferred embodiment, and FIG. 2 shows a sectional view thereof. As shown in the drawings, the dial gauge of the embodiment consists of a rectangular box-shaped body case 11 as a body; a spindle 13 disposed to the bottom face of the body case 11 via a stem 12 to move in the axis direction; a detecting means 14 for detecting the moving displacement amount of the spindle 13; and a digital display 15 displaying the moving displacement amount (i.e. a measured value) of the spindle 13, detected by the detecting means 14, in a digital form.

The spindle 13 has a probe 21, abutting to an object to be measured, at the bottom end thereof, and is provided with a rotation stop pin 22 at the upper end thereof. The rotation stop pin 22 is slidably inserted into a guide groove 23 which is formed along the axis direction of the spindle 13 in the body case 11. Thereby, the spindle 13 can be moved in only the axis direction without rotating.

Figure 3:
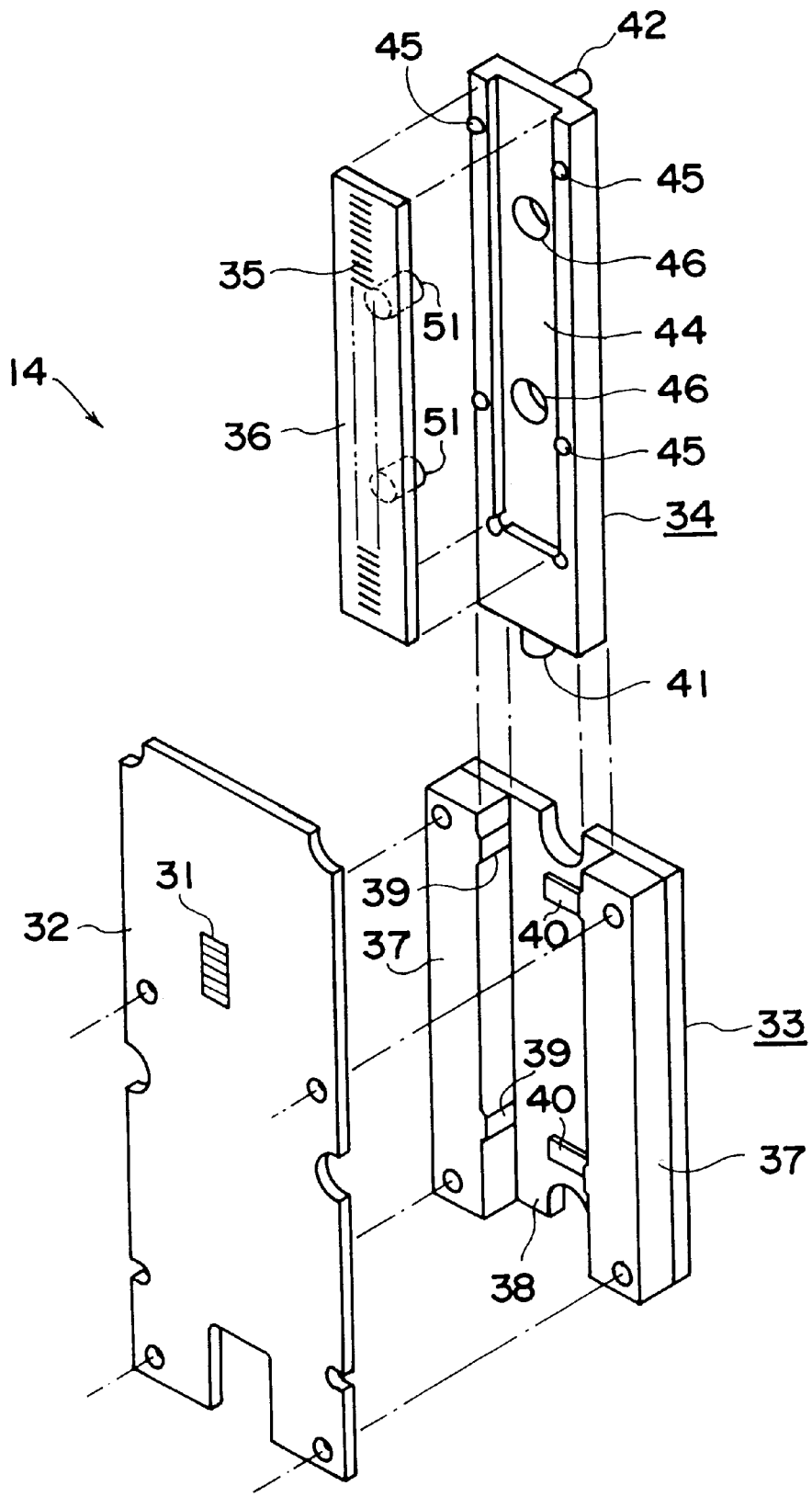
FIG. 3 is a perspectively exploded view showing a detecting means of the preferred embodiment.

As shown in FIG. 2 and FIG. 3, the detecting means 14 is composed of an electrical base 32 having a stationary detection element 31 and fixed along the axis direction of the spindle 13 in the body case 11; a guide 33 screwed onto the electrical base 32 through a plurality of screws; a scale holder 34 placed in a space between the electrical base 32 and the guide 33 and moving in the same direction as the moving direction of the spindle 13; and a scale 36 having a movable detection element 35 opposite the stationary detection element 31 separated therefrom at a predetermined gap G in the scale holder 34. In this case, a light emitting and receiving portion IC for the stationary detection element 31 and an optical lattice for the movable detection element 35 constitute the optical detecting means 14 for optically detecting the relative moving displacement amount between the detection elements 31 and 35.

The guide 33 is composed of a pair of guiding blocks 37 fixed to both sides of the face of the electrical base 32 with the stationary detection element 31 in between, and a plate shaped guiding plate 38 extended across a pair of the guiding blocks 37. The guide is formed of synthetic resin, in this case, a glass nylon type polyamide resin contains 30% of glass. A vertical pair of protrudent portions 39 guiding both sides of the scale holder 34 are formed on the inner side face of the guiding block 37. A vertical pair of protrudent portions 40 abutting to the back face of the scale holder 34 are formed on the inner face of the guiding plate.

The scale holder 34 is formed of synthetic resin which is the same material as that of the guide 33, and is provided on the lower end face thereof with an abutting portion 41 abutting the top end of the spindle 13, and an engaging pin 42 on the back face thereof. The engaging pin 42 engages a spring 43 (see FIG. 2) forcibly pressing the scale holder 34 in a direction in which the abutting portion 41 is abutted to the top end of the spindle 13 all the time. On the front face of the scale holder 34, namely, the face confronting the stationary detection element 31, a recess portion 44 for holding the scale 36 is formed. On each side of the face with the recess portion 44 between, a vertical pair of projections 45 abutting to each side of the face of the electrical base 32 are formed. In an upper area and a lower area of the recess portion 44, a accommodating hole 46 is formed to pass through.

Figure 4:
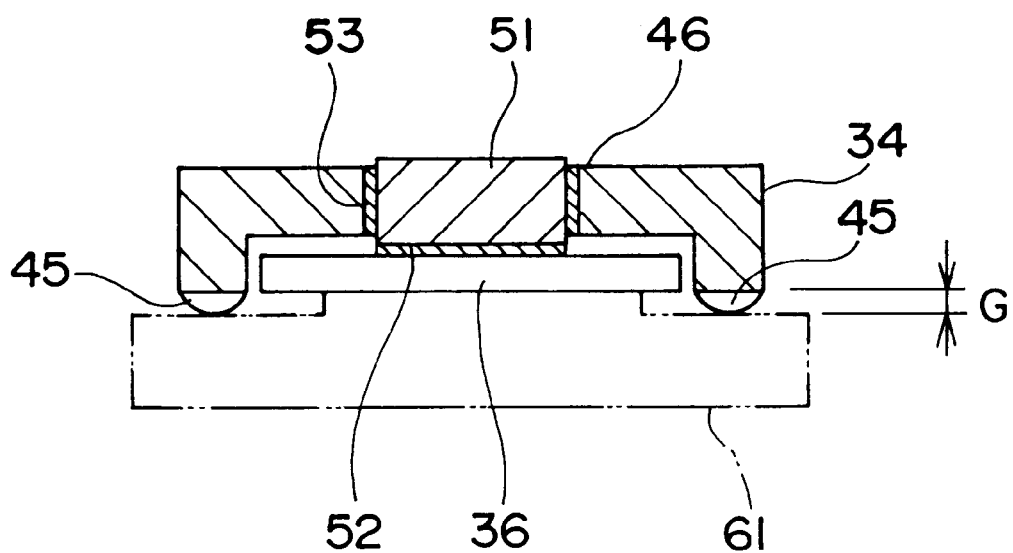
FIG. 4 is a sectional view showing a state in the adhesion of a scale to a scale holder in the preferred embodiment.

As shown in FIG. 4, the scale 36 is provided with a pair of projections 51 at positions on the back face (which is opposite the face confronting the stationary detection element 31) corresponding to the accommodating holes 46. Each projection 51 is adhered onto the back face of the scale 36 through an adhesive layer 52, and adhered to the scale holder 34 in the circumferential direction, namely, through an adhesive layer 53 laid between the outer circumferential face of the projection 51 and the inner circumferential face of the accommodating hole 46 in the state that the projection 51 is inserted into the accommodating hole 46 of the scale holder 34. In other words, the scale 36 is adherently fixed to the scale holder 34 at two points (the two points of projections 51). Here, as shown in FIG. 4, by using a jig 61, the distance from the distal end of the projection 45 to the surface of the scale 36, namely, the distance between the stationary detection element 31 and the movable detection element 35 is adjusted to result in a predetermined gap G.

In the aforementioned structure, the spindle 13 is displaced in the axial direction, whereupon the scale holder 34 is synchronized with the displacement of the spindle 13 and moved in the moving direction of the spindle 13. At this time, the movable detection element 35 fixed to the scale holder 34 through the scale 36 is moved while maintaining the predetermined gap G with respect to the stationary detection element 31, so that the moving displacement amount of the movable detection element 35 with respect to the stationary detection element 31 is detected as an electric signal, and then it is displayed on the digital display 15 in a digital form.

In consequence, according to the embodiment, the scale holder 34 is formed of synthetic resin, so that the total weight of the dial gauge can be reduced as compared with a scale holder made of metal, resulting in the improvement of portability and operability.

The scale 36 is adhered at two points of the scale holder 34, so that the movable detection element 35 is not susceptible to the expansion and shrinkage of the adhesive layer as compared with a case where the overall face of a scale is adhered to a scale holder through an adhesive layer. Therefore, the constant gap G between the stationary detection element 31 and the movable detection element 35 can be ensured while a processing dimension error of each component is absorbed, and the constant gap G can be retained stably for a long time.

In processes for adhering the scale 36 having the movable detection element 35 to the scale holder 34, a pair of the projections 51 are disposed on the back face of the scale 36, and each projection 51 is inserted into the accommodating hole 46 formed in the scale holder 34, and in this state, the projection 51 is adhered thereto through the adhesive layer 53 laid between the projection 51 and the accommodating hole 46 in the circumferential direction, so that the gap G between the stationary detection element 31 and the movable detection element 35 can be adjusted while the scale 36 is being displaced in the extending direction of the projection 51, therefore the adjustable range can be defined to be larger without the increase of the thickness of the adhesive layer 53. That is to say even the relatively large processing-dimension-error of each component can be absorbed. The scale 36 is adhered through the adhesive layer 53 in the circumferential direction of the projection 51, so that the influence of the expansion and shrinkage of the adhesive layer 53 can be decreased.

Each projection 51 is adhered through the adhesive layer 52 to the back face of the scale 36, so that the production of the scale 36 is easier and the processing dimension error of each component is absorbed by the adhesive layer 52 between the scale 36 and the projection 51.

The guide 33 is screwed to the electrical base 32 and the scale holder 34 is movably disposed in a space between the electrical base 32 and the guide 33, so that the scale holder 34 is stably moved in the same direction as the moving direction of the spindle 13 while retaining a constant bearing with respect to the electrical base 32. Therefore, the gap G between the movable detection element 35 disposed in the scale holder 34 and the stationary detection element 31 fixed on the electrical base 32 is retained to be constant, resulting in the assurance of a high precise measurement.

The projection 45 is formed on the face of the scale holder 34 which has the scale 36, and the projection 45 abuts to each side of the face of the electrical base 32 with the stationary detection element 31 between, so that the gap G between the stationary detection element 31 and the movable detection element 35 can be defined in the range from the face of the scale holder 34 with the scale 36 to the projection 45 (the range of the depth of the recess portion 44 and the height of the projection 45). Therefore, the gap G between the stationary detection element 31 and the movable detection element 35 is accurately defined with a simple structure.

A pair of the protrudent portions 39 guiding both sides of the scale holder 34 are formed on the inner side face of the guiding block 37 constituting the guide 33, and a pair of the protrudent portions 40 abutting to the back face of the scale holder 34 are formed on the inner face of the guiding plate 38, so that the sliding resistance produced in the movement of the scale holder 34 is decreased.

The scale holder 34 and the guide 33 are formed of a glass nylon type polyamide resin, so that the sliding performance of the scale holder 34 with respect to the guide 33 is retained for a long time. That is to say a glass nylon type polyamide resin has the high hardness and the high strength, so that the sliding performance of the scale holder 34 with respect to the guide 33 is retained for a long time.

In the aforementioned embodiment, the scale holder 34 is described as an independent component from the spindle 13, but the scale holder 34 can be directly united to the spindle 13. In this case, the guide 33 is needless.

In the aforementioned embodiment, the projection 51 is adhered through the adhesive layer 52 onto the back face of the scale 36, whereas the projection 51 can be unitedly formed on the back face of the scale 36 in advance. In this case, the process in which the projection 51 is adhered through the adhesive layer 52 onto the back face of the scale 36 can be omitted.

Further, in the aforementioned embodiment, the scale holder 34 and the guide 33 are formed of a glass nylon type polyamide resin, but the scale holder 34 may be formed of another type of synthetic resin, such as polyacetal(s), or polybutylene terephthalate.

Alternatively, the scale holder 34 and the guide 33 may be formed from synthetic resins that differ from each other. Preferably, the scale holder 34 is made of a nylon type polyamide resin and the guide 33 is made of an acetal resin. In this case, in addition to the hardness and the strength similar to that of the case where the scale holder 34 and the guide 33 are formed of a glass nylon type polyamide resin, merits such as an easy production, the reduction in warpage, and so on can be obtained, and the production costs can be reduced.

In the embodiment described herein, the optical detecting means 14 is used, but, for example, a capacitance detecting means can be used.

Although the aforementioned embodiment is described using the dial gauge as an example, this invention can be applied for any measuring instrument detecting the moving displacement amount of the spindle with the stationary detection element and the movable detection element.

According to the measuring instrument of the present invention, the reduction in weight is achieved and disadvantages with the reduction in weight are resolved. That is to say, there are effects that the constant gap between the stationary detection element and the movable detection element is ensured while a processing dimension error of each component is absorbed, and the shrinkage of the adhesive layer has no influence.

What is claimed is:

1. A measuring instrument comprising:

a body;

a spindle provided in the body to move in a moving direction;

a synthetic resin made holder;

a detecting means having a stationary detection element fixed in the body and a movable detection element placed opposite the stationary detection element and separated therefrom by a predetermined gap, the movable detection element having a face confronting the stationary element and an opposite face being provided with at least one projection, the detecting means detecting a relative moving displacement amount between both detecting elements as an electric signal; and at least one accommodating hole for holding said at least one projection is disposed at a position of said holder corresponding to said at least one projection so that the movable detection element is adhered to said holder primarily through an adhesive layer laid between an outer circumferential face of each said projection and an inner circumferential face of the corresponding accommodating hole when said at least one projection is inserted into said accommodating hole, wherein the holder is synchronized with and moves in the moving direction of the spindle and the predetermined gap is maintained.

2. The measuring instrument according to claim 1, wherein the movable detection element is adherently fixed to said holder at two points which are separated from each other along the moving direction of the spindle at a predetermined spacing.

3. The measuring instrument according to claim 1, wherein said projection is adhered through a second adhesive layer onto the face of the movable detection element which is opposite the other face confronting the stationary detection element.

4. The measuring instrument according to claim 1, wherein said holder is movably held with a guide that is made of synthetic resin and disposed in the body.

5. The measuring instrument according to claim 4, wherein said holder and the guide are both formed of a glass nylon type polyamide resin.

6. The measuring instrument according to claim 4, wherein said holder is formed of a nylon type polyamide resin, and wherein the guide is formed of an acetal resin.

7. The measuring instrument according to claim 1, further comprising:

an electrical base disposed along the axial direction of the spindle in the body, the electrical base having the stationary detection element on a face thereof; and at least one sliding projection formed on a face of said holder facing the electrical base, the sliding projection being in contact with and sliding on the face of the electrical base on opposing sides of the stationary detection element.

8. A measuring instrument, comprising:

a body;

a spindle disposed in the body to move axially; and a detecting means for detecting the moving displacement amount of the spindle as an electric signal, the detecting means comprising:

an electrical base disposed along an axial direction of the spindle in the body, the base having a stationary detection element on a face thereof;

a guide made of synthetic resin that is screwed to the electrical base;

a synthetic resin holder which is placed in a space between the electrical base and the guide to synchronize with the spindle and move in a moving direction of the spindle;

a scale having a movable detection element, the scale being disposed in the holder to face the stationary detection element at a predetermined gap, wherein the holder is provided with a plurality of accommodating holes formed along the moving direction of the spindle and the scale is provided with a corresponding plurality of projections which are accommodated in respective accommodating holes, the scale being adhered to the holder primarily though an adhesive layer placed between an outer circumferential face of each of the projections and an inner circumferential face of a corresponding one of the accommodating holes.

9. The measuring instrument according to claim 8, wherein a sliding projection is formed on a face of said holder facing the electrical base, the sliding projection being in contact with and sliding on the face of the electrical base on opposing sides of the stationary detection element.

10. The measuring instrument according to claim 8, wherein said guide consists of a pair of guiding blocks which are fixed to the face of said electrical base with the stationary detection element therebetween, and a guiding plate which extends across the pair of guiding blocks.

11. The measuring instrument according to claim 8, wherein a pair of protrudent portions for guiding both sides of said holder are formed on an inner side face of each of the guiding blocks.

12. The measuring instrument according to claim 8, wherein a pair of protrudent portions abutting a face of said holder that is opposite the movable detection element are formed on an inner face of said guiding plate.

13. The measuring instrument according to claim 8, wherein said holder and said guide are formed of a glass nylon type polyamide resin.

14. The measuring instrument according to claim 8, wherein said holder is formed of a nylon type polyamide resin, and wherein said guide is formed of an acetal resin.

* * * * *